Oct. 30, 1923.
K. WINKELMÜLLER
1,472,146
METHOD FOR MANUFACTURING RIBBED PIPES
Filed Aug. 5, 1921
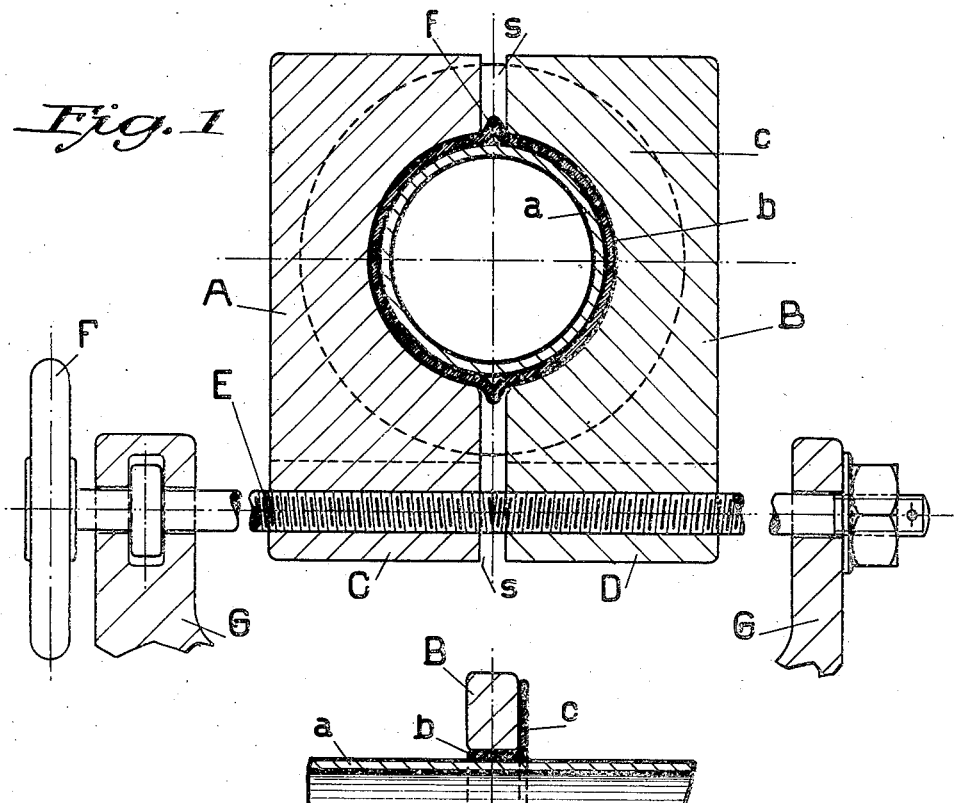
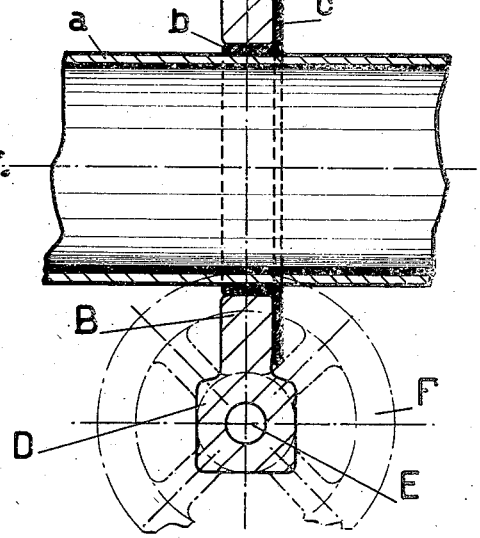

Patented Oct. 30, 1923.

1,472,146

UNITED STATES PATENT OFFICE.

KARL WINKELMÜLLER, OF LEIPZIG-LINDENAU, GERMANY.

METHOD FOR MANUFACTURING RIBBED PIPES.

Application filed August 5, 1921. Serial No. 490,131.

*To all whom it may concern:*

Be it known that I, KARL WINKELMÜLLER, a citizen of the German Republic, residing at Leipzig-Lindenau, Germany, have invented certain new and useful Improvements in Methods for Manufacturing Ribbed Pipes, of which the following is a specification.

The shrinking on of flanged disks of sheet metal upon the tube which serves as core for the production of ribbed pipes such as used in heating or cooling plants is rather expensive when large quantities of such disks have to be shrunk on. It has already been proposed to mount the disks on the tube in the cold way by pressing the same against the tube through rolling in the flange. This method suffers however from the inconvenience that the roller exerts a pressure upon the flange only at one point so that the fixing of the flange by rolling requires much time and that, owing to the unavoidable permissible deviations of the diameter of the core tube, an unnecessary rotation of the disk of sheet metal is caused before any of the parts of the flanged edge can be pressed against the core tube.

These inconveniences are avoided according to this invention. In order that the invention may be clearly understood, I shall proceed to describe the same with reference to the working method illustrated by way of example in the accompanying drawing, wherein:—

Fig. 1 shows in horizontal section by way of example an arrangement for the execution of the method.

Fig. 2 is a vertical section of Fig. 1.

$a$ designates the core tube and $b$ the flange of the disk $c$ of sheet metal. Two jaws A, B are used which have circular cavities corresponding approximately with the outer diameter of the flange $b$. Each jaw A, B has an extension C, D respectively in which a threaded boring is provided which is designed to receive the screw spindle E. The part of the spindle E which corresponds with the extension C has a left hand thread, the other part, corresponding with the extension D having a right hand tread or inversely. A hand wheel F serves for rotating the spindle E. G are bearings for the spindle E.

If now the hand wheel F is turned so that spindle E rotates so that the jaws A and B are moved the one towards the other, a pressure is simultaneously exerted upon all points of the flange so that the flange is uniformly pressed against the tube $a$ with the exception of the points which are situated in the gap $s$ between the jaws. The material of the compressed flange $b$ can thus be pressed into the gap $s$ when the diameter of the core tube $a$ should be smaller than the inner diameter of the flange owing to the unavoidable permissible deviation from the normal diameter. The material which has been pressed into the gap $s$ forms a fold $f$ (Fig. 1) upon the outer surface of the flanged edge which serves to ensure the adhesion of the sheet iron disk upon the core pipe and further the secure position of the ribs under the thermic stress to which the ribbed pipe is submitted in service.

The spindle for operating the jaws is given by way of example only and can be replaced by any other convenient device.

I claim:—

A method for the manufacturing of ribbed pipes consisting in producing on the inner edge of the annular disk designed to form the rib a flange the inner diameter of which is slightly greater than the outer diameter of the pipe, in pushing the flanged annular plates on the pipe and in compressing the flanges of said annular disks while in the cold state by means of a pressing machine so that the inner surface of the flange is tightly pressed upon the pipe the excess metal of the flange being formed by extrusion into two beads.

In testimony whereof I affix my signature in presence of two witnesses.

KARL WINKELMÜLLER.

Witnesses:
BERTHOLD MOUASELY,
GERTRAUDE BACHMANN.